US011437885B2

(12) United States Patent
Watrin et al.

(10) Patent No.: US 11,437,885 B2
(45) Date of Patent: Sep. 6, 2022

(54) COMPACT GEAR MOTOR

(71) Applicant: MMT AG, Zug (CH)

(72) Inventors: Mathieu Watrin, La Chaux-de-Fonds (CH); Anthony Mellere, Delle (FR)

(73) Assignee: MMT AG, Zug (CH)

(*) Notice: Subject to any disclaimer, the term of this patent is extended or adjusted under 35 U.S.C. 154(b) by 18 days.

(21) Appl. No.: 17/182,472

(22) Filed: Feb. 23, 2021

(65) Prior Publication Data

US 2021/0175776 A1 Jun. 10, 2021

Related U.S. Application Data

(63) Continuation of application No. 16/472,059, filed as application No. PCT/EP2017/084051 on Dec. 21, 2017, now Pat. No. 10,965,188.

(30) Foreign Application Priority Data

Dec. 21, 2016 (FR) ...................................... 1662976

(51) Int. Cl.
*H02K 7/11* (2006.01)
*H02K 7/116* (2006.01)
(Continued)

(52) U.S. Cl.
CPC ............. *H02K 7/116* (2013.01); *F16H 1/227* (2013.01); *H02K 1/148* (2013.01); *H02K 11/33* (2016.01);
(Continued)

(58) Field of Classification Search
CPC ...... F01M 13/00; F01M 13/022; F01M 13/04; F01M 2013/0044; F01M 2013/027;
(Continued)

(56) References Cited

U.S. PATENT DOCUMENTS 9,614,426 B2   4/2017 Heinrich
2004/0085041 A1*  5/2004 Prudham ................. F02D 11/10
                                                                318/721
(Continued)

FOREIGN PATENT DOCUMENTS

DE         101 15 151 A1    10/2002
DE    10 2011 054955 A1     5/2013
(Continued)

OTHER PUBLICATIONS

U.S. Appl. No. 16/472,059, filed Jun. 20, 2019, Mathieu Watrin.

*Primary Examiner* — Naishadh N Desai
(74) *Attorney, Agent, or Firm* — Harness Dickey & Pierce PLC (57) ABSTRACT

The present disclosure relates to a mechatronic actuator consisting of a housing incorporating a shell and a three-phase electric motor formed by a stator excited by electrical coils and by a magnetized rotor, driving an output shaft by means of a gear train, the axis of the rotor, the axis of the output shaft and the axes of the intermediate toothed wheels being parallel, the stator having a radial triangular star shape, the three wound poles forming the three branches of the star, the axes of symmetry of two consecutive wound poles forming a mechanical angle of 120°, the housing also incorporating an electronic circuit, including a capacitor for filtering the electrical signal, the shell having a longitudinal axis, characterized in that the stator is positioned in the hosing in such a way that the axis of symmetry of one of the three wound poles forms an angle of between 70 and 110° with the longitudinal axis.

20 Claims, 5 Drawing Sheets

(51) Int. Cl.
*H02K 11/33* (2016.01)
*F16H 1/22* (2006.01)
*H02K 1/14* (2006.01)
*F16H 57/02* (2012.01)

(52) U.S. Cl.
CPC .............. *F16H 2057/02034* (2013.01); *F16H 2057/02082* (2013.01); *F16H 2057/02086* (2013.01)

(58) Field of Classification Search
CPC .... F02B 37/005; F02B 37/007; F02B 37/162; F02D 2009/0205; F02D 2009/0206; F02D 2009/022; Y02T 10/12; F02M 25/06; F02M 35/10157; F02M 35/10222; F16H 1/227; F16H 2057/02034; F16H 2057/02069; F16H 2057/02082; F16H 2057/02086; H02K 1/14; H02K 1/148; H02K 11/02; H02K 11/33; H02K 11/40; H02K 2203/03; H02K 2213/03; H02K 5/04; H02K 5/225; H02K 7/116; H02K 7/14; Y02E 40/60

See application file for complete search history.

(56) References Cited

U.S. PATENT DOCUMENTS

2017/0324284 A1   11/2017   Andrieux et al.
2018/0340705 A1   11/2018   Bottger et al.

FOREIGN PATENT DOCUMENTS

| | | | |
|---|---|---|---|
| DE | 10 2014 107900 A1 | 12/2014 | |
| DE | 20 2016 000143 U1 | 3/2016 | |
| DE | 10 2015 210648 A1 | 12/2016 | |
| EP | 1911951 A1 | 4/2008 | |
| FR | 3030147 A1 * | 6/2016 | ............. H02K 1/146 |
| WO | WO 2002/029959 A1 | 4/2002 | |
| WO | WO 2016/092035 A1 | 6/2016 | |
| WO | WO-2016092035 A1 * | 6/2016 | ............. H02K 1/146 |

* cited by examiner

COMPACT GEAR MOTOR

CROSS-REFERENCE TO RELATED APPLICATIONS

This application is a continuation of U.S. patent application Ser. No. 16/472,059, filed on Jun. 20, 2019, which is a National Phase Entry of International Patent Application No. PCT/EP2017/084051, filed on Dec. 21, 2017, which claims priority to French Patent Application No. 1662976, filed on Dec. 21, 2016, all of which are incorporated by reference herein.

TECHNICAL FIELD

The present invention relates to the field of mechatronic actuators intended in particular for the control of mechanical components of a motor vehicle, for example air vents, air conditioning flaps or, more generally, valve shutters. These are components requiring a relatively high torque, with a displacement of a few tens of degrees and a typical positioning accuracy of less than 5 degrees, as well as a minimal space requirement.

BACKGROUND

The patent application DE102014107900 describing an actuator with an electric motor, in particular a brushless DC motor with a stator and a rotor with a drive pinion that transmits movement to a gear train with at least one intermediate wheel, is known as the state of the art. The German patent application DE102011054955 describes another example of such a prior art actuator.

The prior art solutions are not optimized as regards space requirements. The filling of the internal volume of the housing is not maximized, which results in excessive dimensions and space requirements. In addition, vibration and shock resistance is not totally satisfactory for automotive applications, and vibration can cause the printed circuit to unexpectedly leave its supports, or the accidental disassembly of certain mechanical or electromagnetic components.

SUMMARY

In order to remedy these disadvantages, the invention, in its broadest sense, relates to a mechatronic actuator consisting of a housing incorporating a shell and a three-phase electric motor formed by a stator excited by electric coils and by a magnetic rotor, driving an output shaft by means of a gear train, the axis of said rotor, the axis of the output shaft and the axes of the intermediate toothed wheels being parallel, said stator having a radial triangular star shape, the three wound poles of which form the three branches of the star, the axes of symmetry of two consecutive wound poles forming a mechanical angle of 120°, the housing also incorporating an electronic circuit comprising a capacitor for filtering the electrical signal, the shell having a longitudinal axis (L), wherein the stator is positioned in the housing in such a way that the axis of symmetry of one of said three wound poles forms an angle between 70 and 110° with the longitudinal axis (L).

Preferably, the stator is positioned in the housing in such a way that the axis of symmetry of one of the three wound poles forms an angle of 90° with the longitudinal axis (L). According to an alternative solution, the stator is positioned in the housing so that the axis of symmetry of one of the three wound poles forming an angle between 70 and 110° with the longitudinal axis (L) has a chamfer at the area nearest the side wall. According to a particular embodiment, said filtering capacitor is constituted by a tubular component mounted perpendicular to the plane of the printed circuit, said capacitor being positioned in the space delimited on the one hand by two consecutive stator poles 42, 43 among which a pole positioned between 70 and 110° with respect to the median plane, and on the other hand by the angle of the housing located opposite said two complementary stator poles.

Preferably, all the electronic components are soldered on the surface of the printed circuit facing the stator, said printed circuit having a hole for passing the rotor axis and tin-plated holes for inserting the connection studs of the three electrical coils, as well as the pins of the electrical connector, said pins all extending parallel to the mechanical axes, towards the surface of the printed circuit. Advantageously, the printed circuit has at least one hole or notch for the passage of a mechanical axis of one of said toothed wheels. Preferably, the printed circuit has a dimension such that its projection in a transverse plane is inscribed in the projection of the circle circumscribed to said stator, on said transverse plane, except for the rear part of the printed circuit corresponding to the connection of the electrical connector and in that said printed circuit is positioned with respect to said housing to preserve, with respect to the side faces on either side, a space with a width greater than 10% of the inner width of said housing.

The actuator according to the invention comprises, according to a particular method of implementation, a metal spring positioned in compression between a non-insulated zone of the cylinder head (yoke) of said stator and a conductive ground track of the printed circuit. Advantageously, said stator has a non-insulated hole to receive the lower part of said spring, the peripheral surface of said spring coming into contact with the non-insulated inner surface of said hole when the spring is compressed by the printed circuit.

According to a particular alternative solution, said housing consists of a complementary shell and a closure cover, one of the lateral faces of said shell having an inner protrusion pierced by a through cavity, positioned between two toothed wheels, and a second protrusion pierced by a cavity with a non-circular cross-section, said cover having two studs matching said cavities, of a length greater than other connecting studs, the cover also having bearings for guiding the upper end of the mechanical axes. Advantageously, said cover also has at least one stud forming a stop for the printed circuit, said stop not coming into contact with the printed circuit when the latter is in its nominal position. According to a particular embodiment, said cover also has at least one stud forming a stop for the stator, said stop not coming into contact with the stator when the latter is in its nominal position. According to another particular embodiment, the housing has three attachment extensions arranged at three corners of the housing, each of said extensions being traversed by a hole, the axis of which is parallel to the mechanical axes of the motor and the toothed wheels, one of said extensions having a positioning tab in a matching housing, another of said extensions having a clip claw when the housing is pivoted relative to said positioning tab.

BRIEF DESCRIPTION OF THE DRAWINGS

The present invention will be best understood upon reading the following detailed description of a non-limiting exemplary embodiment, while referring to the appended drawings, wherein.

DETAILED DESCRIPTION OF AN EXEMPLARY EMBODIMENT

Figure 1:
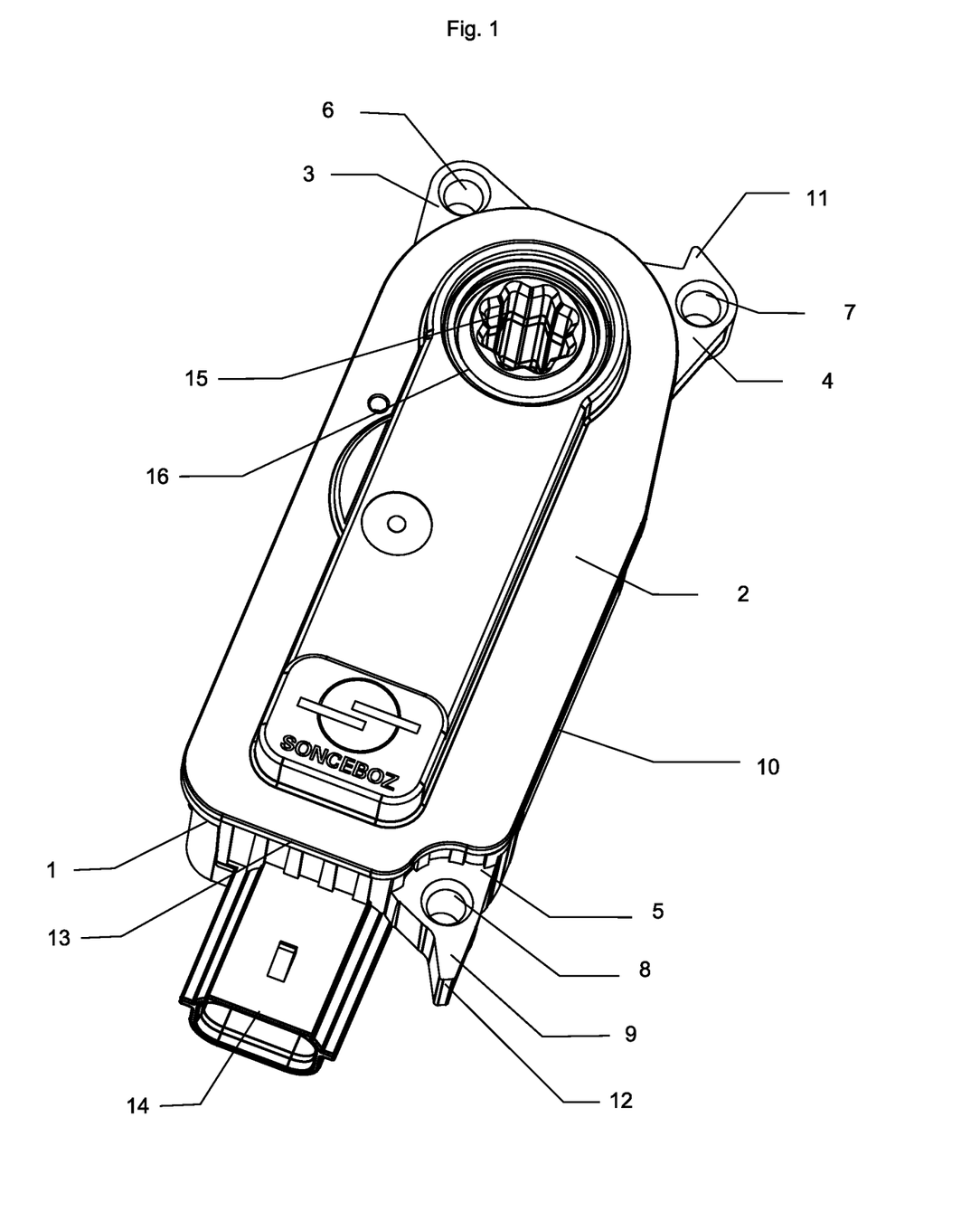
FIG. 1 shows a three-quarter top view in perspective of an actuator according to the invention.

FIG. 1 shows an external view of an exemplary actuator, consisting of a shell 1 closed by a cover 2. The shell 1 has three extensions 3, 4, 5 at three of its corners. Each of the extensions has one hole respectively 6, 7, 8.

Two of the extensions 4, 5 have a double attaching function:
either by screwing or riveting through the holes 7, 8
or by clipping.

To allow clip-on attachment, one of the extensions 5 has a tab 9 that can be fitted in a housing provided on an accommodating structure. The extension 4, provided on the same side face 10 as the extension 5 fitted with the tab, has a hook 11 which cooperates with a matching part of the accommodating structure. The installation is done by positioning the actuator by engaging the tab 9 in the accommodating area, then tilting it with respect to the lower edge 12 of the tab, until the hook 11 is engaged in the matching part of the accommodating structure.

One of the transverse faces 13 is extended by a hollow sleeve 14 for the insertion of a male connector provided on a connecting cable. The cover 2 has an opening 15 inside which a bearing 16 for guiding the output wheel is placed. Optionally, the housing can also be symmetrically drilled to allow the passage of a through transmission axis or the connection of two transmission axes to the actuator.

Figure 2:
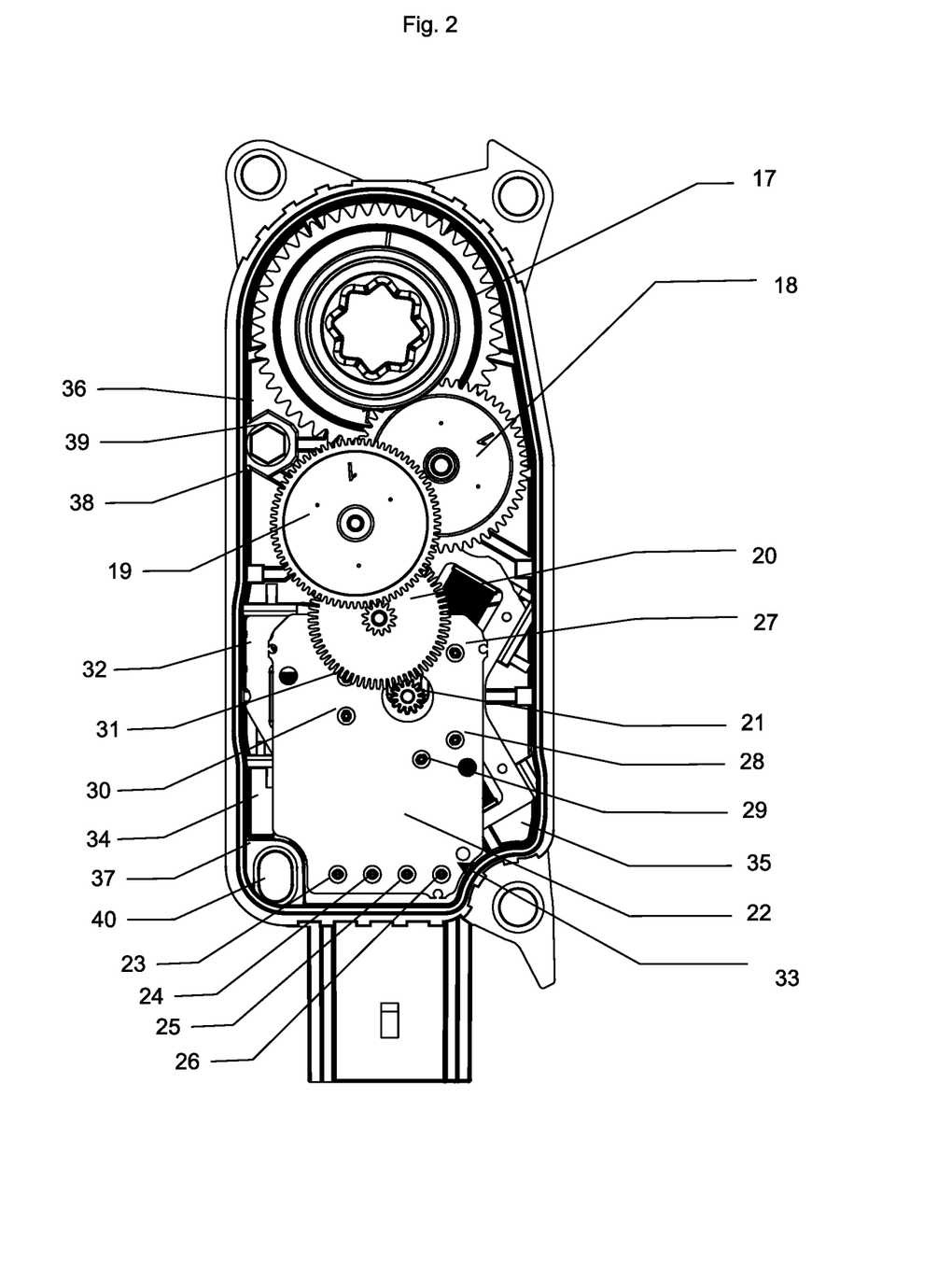
FIG. 2 shows a view according to a median cross-sectional plane of the actuator according to the invention, with the cover and the printed circuit being removed.

The output wheel can have different cross-sections, on one side and on the other, for connecting axes of different cross-sections. FIG. 2 shows a top view of the actuator with the cover 2 being removed. The output wheel 17 is driven by a gear train consisting of a succession of toothed wheels 17 to 21, mounted on parallel axes, perpendicular to the plane of connection between the cover 2 and the shell 1.

The rotor 71 of the electric motor drives a wheel 21 driving the gear train. The rotor axis passes through a hole in a printed circuit 22.

No electronic components are mounted on the upper side of the printed circuit 22, which allows a wave soldering process to be carried out in a single machine pass. The printed circuit 22 has a series of tin-plated holes 23 to 26 for connection to the connector pins, extending perpendicular to the median plane. It also has tin-plated holes 27 to 31—a sixth tin-plated hole being hidden in FIG. 2 by the toothed wheel 20—for connecting the power supply studs of the electric coils. These studs are, for example, press-fit studs that allow the solderless electrical connection of the printed circuit 22 to be made by simply pushing forward of the printed circuit 22 over the erected studs in a direction perpendicular to the surface of the printed circuit 22.

The surface of the printed circuit 22 does not cover the surrounding surface of the stator 32. The projection of the circle circumscribed to the stator 32 on a transverse plane completely covers the projected surface of the printed circuit 22 on the same plane, with the exception of the part 33 of the printed circuit 22 connecting with the connector. In addition, the printed circuit 22 does not come into contact with the edges of the shell 1, but preserves on either side a space 34, 35 with a width greater than 10% of the inner width of the shell 1.

The inner surface of the side wall 38 of the shell 1 has a first inner protrusion 36 and a second inner protrusion 37. The first inner protrusion 36 is positioned in the space available between the outlet wheel 17 and the intermediate toothed wheel 19. It has a cavity 39 with an hexagonal section to receive a positioning pin with a circular section 60 provided on the cover 2 and visible in FIG. 5.

Figure 3:
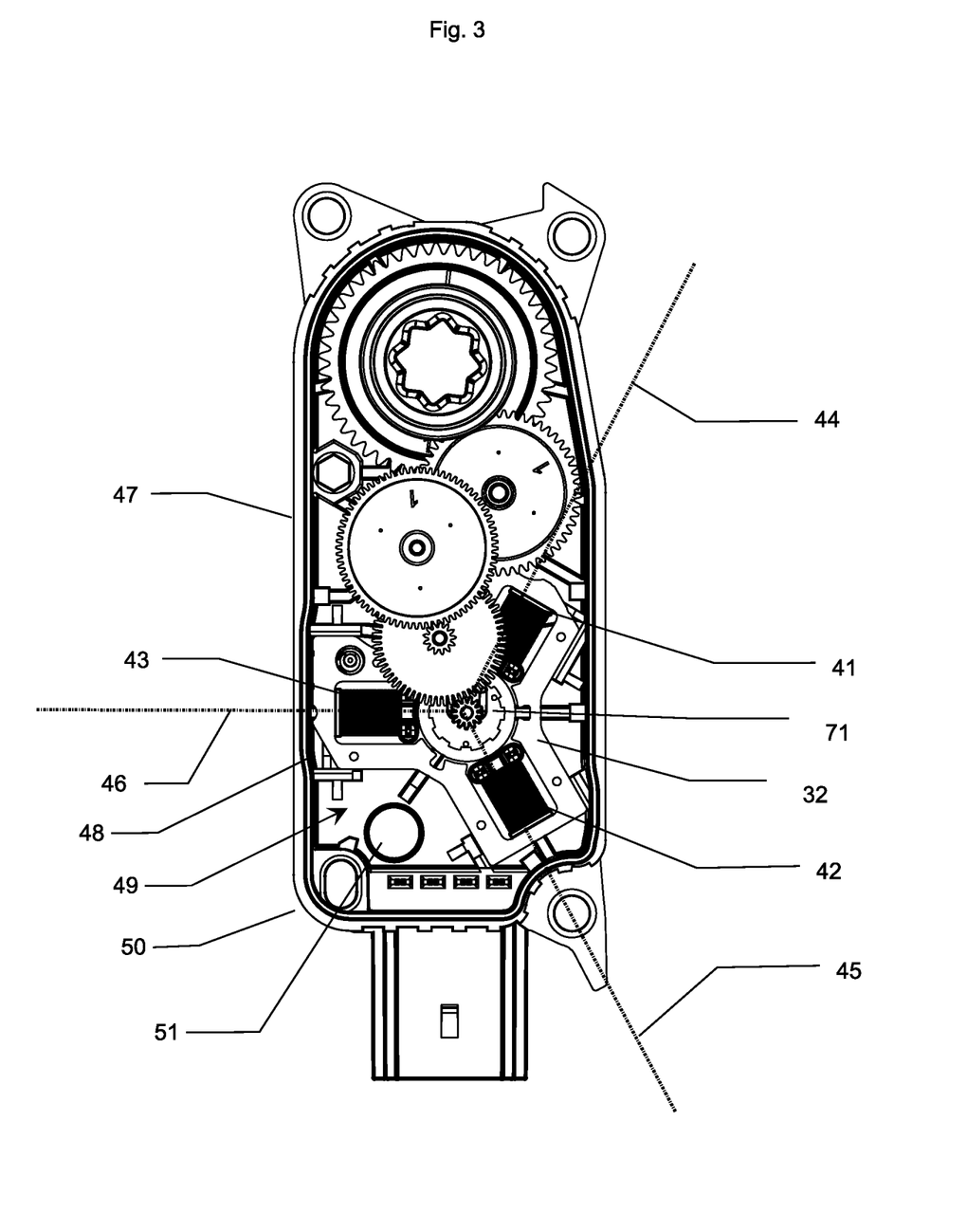
FIG. 3 shows a view according to a median cross-sectional plane of the actuator according to the invention, with the cover being removed.

The second inner protrusion 37 is positioned in the corner of the shell 1 with no outer protrusion. It has an oblong through cavity 40 in the example described, with a main axis parallel to the lateral face 38 to facilitate the positioning of the cover 2 in relation to the shell 1. This through cavity 40 is intended to receive an anti-rotation pin 61, visible in FIG. 5 with a cross-shaped section and extending perpendicular to the inner surface of the cover 2. FIG. 3 shows a view of the inside of the actuator after removing the cover 2 and the printed circuit 22.

The stator 32 has three radially extending wound poles 41 to 43 and is formed by a structure of stacked sheets. Each pole 41 to 43 has a central tooth surrounded by a coil. The centre axes 44 to 46 of the respectively wound poles 41 to 43 form a mechanical angle of 120° two by two. The stator thus has a radial triangular star shape with a star branch.

The shell 1 has a longitudinal axis L connecting the connector 14 to the output wheel 17. This longitudinal axis is parallel to the two lateral faces of the shell 1, each extending in the longitudinal direction. The stator 32 is positioned in the shell 1 such that one of the poles 43 is oriented to form an angle of about 90° with respect to the longitudinal axis L of the shell 1. This positioning reduces the width of the shell and therefore the overall dimensions of the actuator and optimizes the occupancy of the inner space of the shell 1.

A tolerance of ±20°, and preferably ±10° is possible because the effect on the space requirement is minimal due to a cosine impact of this angular variation. The effect of a slight angular offset from the optimal 90° position can be further reduced by providing a chamfer 48 at the angle of the stator contacting the side face 47. This positioning of the rotor 32 also makes it possible to create a space 49 between the two poles 42, 43 of the stator and the angle 50 of the shell. This space makes it possible to position a filter capacitor 51, typically chemical and cylindrical in shape, soldered to the printed circuit 22.

Detailed Description of Stator Grounding

Figure 4:
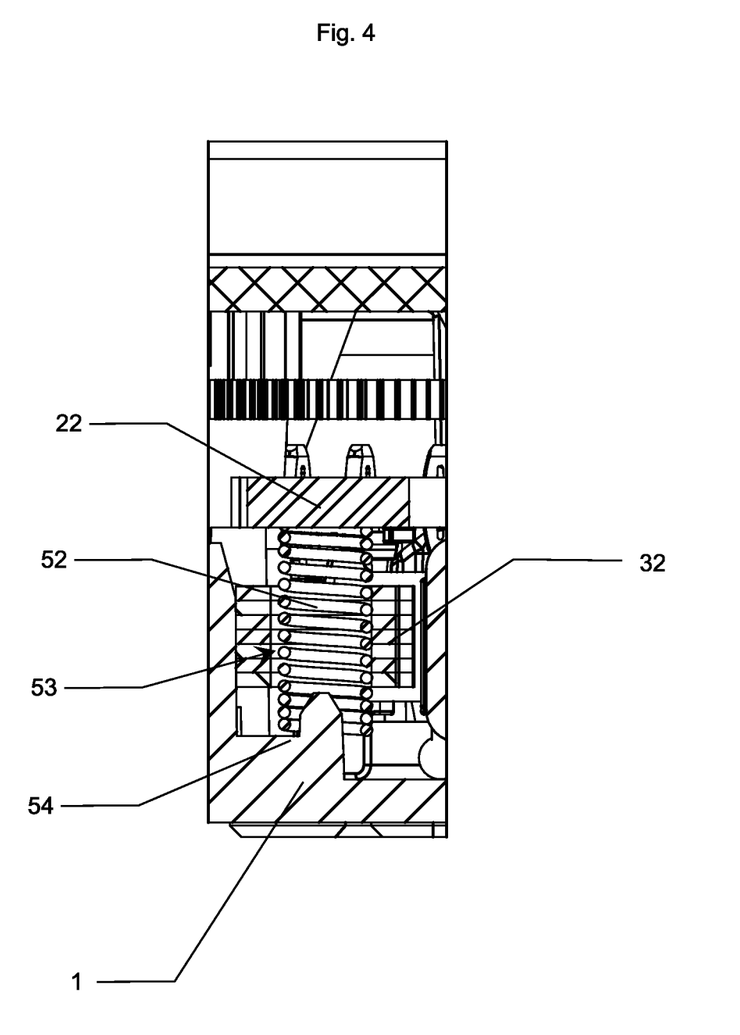
FIG. 4 shows a detailed view of the electric connection between the stator and the printed circuit.

FIG. 4 shows a partial enlarged view of the stator 32 and the printed circuit 22. To achieve the electrical grounding of the stator 32, the actuator has a metal spring 52 inserted into a through hole 53 formed in the stator yoke. The bottom of the shell 1 has a stepped or inclined surface opposite this hole 53 to form a zone for accommodating the lower end 54 of the spring that is not parallel to the transverse plane. This configuration leads to buckling of the spring, when stressed, which forces mechanical and therefore electrical contact between the spring wounds (windings) 52 and the inner surface of the hole 53.

On the opposite side, the spring 52 comes into contact with a conductive track of the printed circuit 22, which is connected to the ground. When the printed circuit is positioned, it rests on the spring 52 and compresses it, thus ensuring a good electrical and mechanical connection between the stator yoke 22 and the conductive track connected to the ground.

Detailed Description of the Cover

Figure 5:
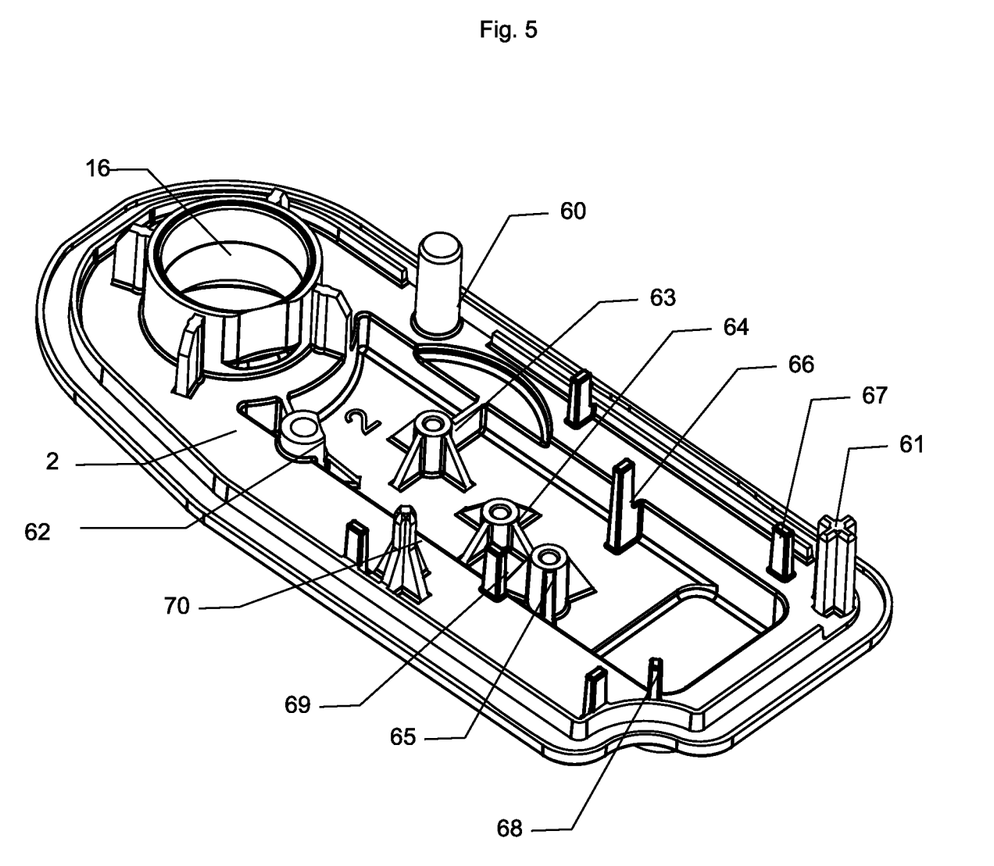
FIG. 5 shows a bottom view of the cover.

FIG. 5 shows a view of the inner surface of the cover. It has a bearing 16 for positioning and guiding the output wheel 17, and bearings 62 to 65 for positioning and guiding the ends of the toothed wheels axles respectively 18 to 21. The cover 2 also has two connecting pins 60, 61 having a length longer than the bearings 62 to 65 in such a way as to enable the cover 2 to be precisely positioned with respect to the shell 1 and mechanical elements, in particular the axes of the intermediate toothed wheels, the output wheel and the rotor 71, in such a way that, when the cover 2 is moved closer to the shell 1, the ends of the axes easily engage the corresponding bearings.

In addition, the cover has four stops 66 to 69 to limit unintended movements of the printed circuit 22 resulting from vibrations. These stops 66 to 69 do not come into contact with the surface of the printed circuit 22 when the latter is in its nominal position, but prevent excessive movement that could disengage the connection studs in case of shocks or vibrations. A stud 70 similarly limits the displacement of the stator 32 without coming into contact therewith when it is in its nominal position.

What is claimed is:

1. A mechatronic actuator comprising:
a housing incorporating a shell;
a three-phase electric motor formed by a stator excited by electric coils and by a magnetized rotor, driving an output shaft by a gear train;
an axis of the rotor, an axis of the output shaft and axes of intermediate toothed wheels being parallel; and
a metal spring positioned in compression between a non-insulated zone of a yoke of the stator and a conductive ground track of a printed circuit.

2. The mechatronic actuator according to claim 1, wherein the stator yoke has a through hole for receiving the metal spring, which forces mechanical and electrical contact between the spring wounds and the inner surface of the hole, when the spring is compressed.

3. The mechatronic actuator according to claim 1, wherein all electronic components are soldered onto the printed circuit surface facing the stator, the printed circuit has a hole, through which the rotor axis passes.

4. The mechatronic actuator according to claim 1, wherein the printed circuit further includes a series of tin-plated holes for the connection of the electric coils.

5. The mechatronic actuator according to claim 1, wherein the motor is a vehicle-air flap actuator having a positioning accuracy within 5 degrees.

6. A mechatronic actuator comprising:
a housing including a shell and a mating cover;
a three-phase electric motor comprising a stator and a rotor, the rotor configured to rotate an output shaft via gears;
an axis of the rotor, an axis of the output shaft and axes of the gears being parallel to each other;
attachment extensions laterally located at corners of the housing, an axis of a hole in each of the attachment extensions being parallel to the axes of the rotor, the output shaft and the gears; and
one of the attachment extensions including a positioning tab and another of the attachment extensions including a claw to avow pivoting relative to the positioning tab, the claw having a substantially triangular shape with a tapered end projecting away from the hole adjacent thereto.

7. The mechatronic actuator according to claim 6, wherein two of the attachment extensions present a double attaching function either by screwing or riveting through the holes or by clipping of the claw when the housing is pivoted in relation to the tab.

8. The mechatronic actuator according to claim 6, wherein one of the attachment extensions includes a hook pointing away from the tapered end of the claw.

9. The mechatronic actuator according to claim 6, further comprising:
a hollow sleeve projecting from an exterior of the shell being configured to receive a male connector;
a printed circuit board located within the shell and having a lateral plane which overlaps with a portion but not all of the stator; and
the axes being perpendicular to the plane of the printed circuit board.

10. The mechatronic actuator according to claim 6, wherein the cover includes an opening, inside of which a bearing for guiding an output wheel is placed.

11. The mechatronic actuator according to claim 6, wherein the housing includes symmetrical holes to allow the passage of a through transmission axis or the connection of two transmission axes to the actuator.

12. The mechatronic actuator according to claim 6, wherein the motor is a vehicle-air flap actuator having a positioning accuracy within 5 degrees.

13. A mechatronic actuator comprising:
a shell;
a three-phase electric motor comprising a stator with electric coils, and a rotor, the electric motor being located within the shell;
the electric motor being a vehicle-aft flap actuator having a positioning accuracy within 5 degrees;
a printed circuit board including an electrical circuit, located within the shell;
gears operably rotated when the rotor is rotated by the stator;
an axis of the rotor passing through an access hole in the printed circuit board; and
multiple metal-plated holes in the printed circuit board internally receiving power supply studs of the electric coils, which are press-fit in the plated holes to create a solderless electrical connection between the stator and the electrical circuit.

14. The mechatronic actuator according to claim 13, further comprising an output shaft rotated by an output wheel which is coaxial with the output shaft, and a central axis of one of three wound poles of the stator forming an angle of about 90° offset from a longitudinal axis of the shell which extends through the output shaft.

15. The mechatronic actuator according to claim 14, wherein the stator is positioned in the shell such that an axis of symmetry of the three wound poles forms an angle between 70 and 110° with respect to the longitudinal axis, and at least one of the poles has a chamfer at an area nearest an internal surface of the shell facing the at least one of the poles.

16. The mechatronic actuator according to claim 13, further comprising:
a peripheral edge of the printed circuit board being laterally inwardly spaced from facing interior surfaces of the shell by greater than 10% of an inner width of the shell;

a central portion of the stator laterally overlapping with the printed circuit board; and a distal end of at least one of the electrical cons of the stator laterally extending outboard of the peripheral edge of the printed circuit board.

17. The mechatronic actuator according to claim 13, further comprising:

a first protrusion located inside the shell within a space between and laterally offset from an output wheel and an intermediate toothed wheel, the first protrusion including an internal polygonal cavity;

a locating pin extending from a cover and being received within the polygonal cavity of the first protrusion;

a second protrusion located within the shell and being located between a peripheral edge of the printed circuit board and an inner surface of the shell, the second protrusion Including an elongated cavity; and an antirotational pin extending from the cover and being received within the elongated cavity of the second protrusion.

18. The mechatronic actuator according to claim 13, further comprising:

a coiled metal spring inserted into a through hole formed in a yoke of the stator;

the shell including a stepped or inclined bottom surface at a bottom of the through hole to accommodate a lower end of the spring, the bottom surface being offset angled relative to a transverse plane of the printed circuit board, the bottom surface, causing the spring to buckle which forces mechanical and electrical contact between a side surface of the spring and the inner surface of the through hole; and an upper end of the spring contacting against an electrically grounded track of the printed circuit.

19. The mechatronic actuator according to claim 13, further comprising a cover includes an opening, inside of which a bearing for guiding an output wheel is placed, the cover being attached to the shell.

20. The mechatronic actuator according to claim 13, further comprising:

attachment extensions laterally located at corners of the housing, a hole being in each of the attachment extensions;

a first of the attachment extensions including a hook;

a second of the attachment extensions including a claw, the claw having a substantially triangular shape with a tapered end projecting away from a pointed end of the hook; and the housing being elongated between the claw and the hook, an output wheel being located closest to the hook and the printed circuit board being located closest to the claw.

* * * * *